United States Patent [19]

Dehennau et al.

[11] Patent Number: 4,652,225
[45] Date of Patent: Mar. 24, 1987

[54] FEED BLOCK FOR A FLAT COEXTRUSION DIE

[75] Inventors: Claude Dehennau, Waterloo; Marc Kerger, Brussels, both of Belgium

[73] Assignee: Solvay & Cie (Societe Anonyme), Brussels, Belgium

[21] Appl. No.: 845,118

[22] Filed: Mar. 27, 1986

[30] Foreign Application Priority Data

Apr. 1, 1985 [FR] France .................. 85 05029

[51] Int. Cl.$^4$ .............................................. B29C 47/06
[52] U.S. Cl. .................................. 425/133.1; 425/171; 425/188; 425/380; 425/466
[58] Field of Search .................. 425/131.1, 133.1, 132, 425/134, 171, 188, 190, 380, 466

[56] References Cited

U.S. PATENT DOCUMENTS 2,897,541  8/1959  Orsini ................................ 425/380
3,860,372  1/1975  Newman .......................... 425/133.1
4,030,334  6/1977  Wagner et al. ................. 425/380 X Primary Examiner—Charles Hart
Attorney, Agent, or Firm—Spencer & Frank

[57] ABSTRACT

The block comprises a central channel (2) which feeds a first molten plastic, and at least one secondary channel (5, 10) which feeds a different molten plastic and connects to the central channel (2) upstream of the die, the central channel (2) in the connection zone, being equipped with a flat portion (11) which alters the cross-section of the channel, the said flat portion (11) being mounted in a removable piece (12) coaxial with the central channel and arranged in a guide tube (13) which intersects the central channel (2) and runs through the feed block (1), the said block being equipped with means (20), (21) for gradually withdrawing the removable piece (12) via the guide tube (13) and for replacing it by another removable piece (18) equipped with an identical or different flat portion (19).

The block is particularly suitable for feeding a flat die which delivers films, sheets or composite panels.

9 Claims, 5 Drawing Figures

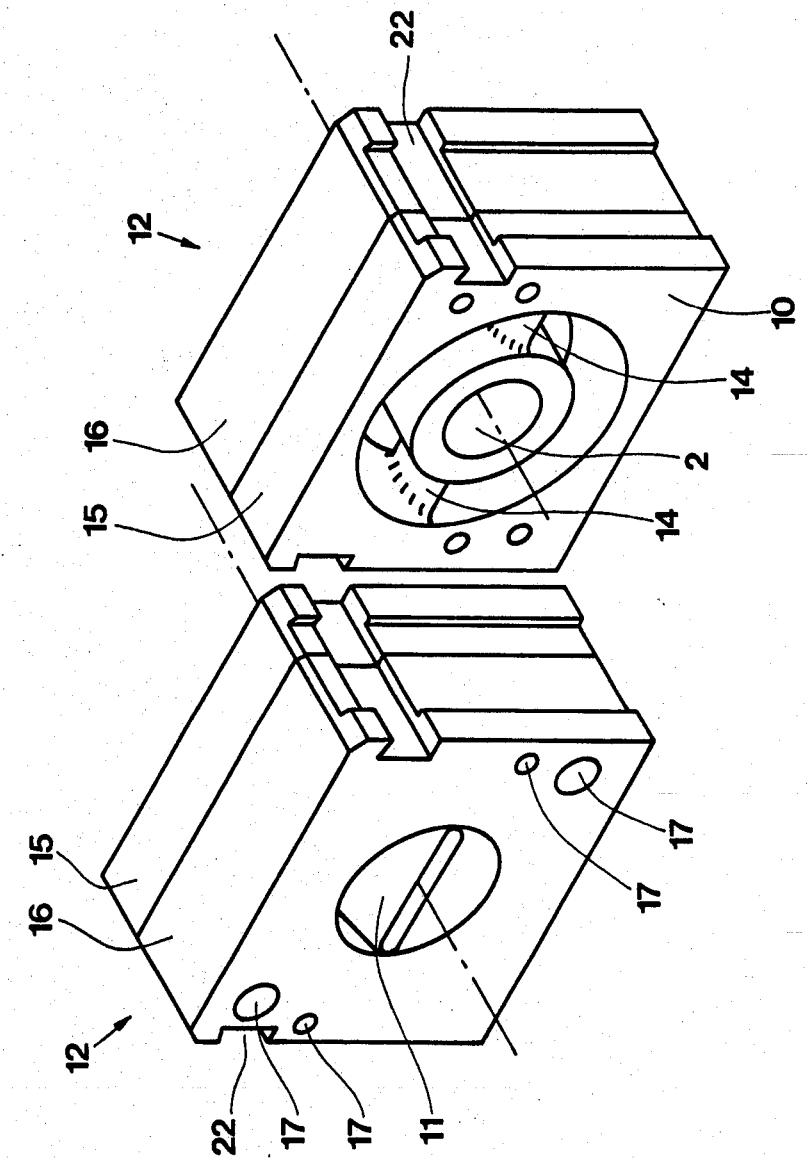

FEED BLOCK FOR A FLAT COEXTRUSION DIE

The present invention relates to a feed block for a flat coextrusion die, which is easy to construct and which readily permits changes in types of production.

To produce multilayer structures such as films, sheets or panels, use is made, in particular, of flat dies which are connected to a feed block which provides the distribution of the various layers of molten thermoplastics which have to be introduced into the die to obtain the desired structure.

In general, a feed block consists of a series of elements which distribute the stream of thermoplastic and comprises a central channel having an inlet connected to a first source of molten thermoplastic and an outlet connected to the flat coextrusion die, and at least one secondary channel possessing an inlet connected to a second source of molten thermoplastic, a distribution torus surrounding the central channel and an outlet connected to the central channel upstream of the flat coextrusion die.

Within the feed block, the core consisting of the thermoplastic fed through the central channel is partially or completely covered by layers of successive thermoplastics introduced via the secondary channels. In the simplest embodiment the thermoplastic stream passing through the feed block has a stratified structure of cylindrical symmetry, varying from upstream to downstream depending on the number of secondary channels and hence on the number of secondary thermoplastic streams encountered.

Because of the different rheological characteristics of thermoplastics generally employed, it is frequently the case that a cylindrical symmetry of this type does not constitute the optimum configuration for a composite thermoplastic stream which feeds a flat coextrusion die for the purpose of producing a particular plane stratified structure.

It has in fact been found from experience that for a number of envisaged combinations of the composite thermoplastic streams it is necessary significantly to modify the geometry of the central polymer stream upstream of one or more confluence zones within a feed block.

By way of example, there may be mentioned the transverse spreading of a main stream by passing through a flat portion of appropriate configuration, of which the outlet geometry, of rectangular, biconcave or biconvex general appearance, can exhibit beads resulting from machining limitations or from the nature and the rheology of the thermoplastics to be combined.

It is obvious that a flat portion geometry employed for producing a particular multilayer structure is not necessarily suitable for moulding a different stratified structure, either due to the relative thicknesses of the various constituents or due to the intrinsic nature of the constituents.

In implementing the production of a given stratified structure or in making a change in production it is thus necessary to be able to modify one or more flat portions, which in general necessitates stoppages and costly cleaning operations. It can moreover prove necessary, during running, to replace a flat portion by another, of identical geometry, because of fouling which has occurred during production.

The object of the present invention is to provide a feed block for a flat coextrusion die which makes it possible, during running, to change one or more flat portions without suffering the abovementioned disadvantages.

The invention hence relates to a feed block for a flat coextrusion die, comprising a central channel possessing an inlet which can be connected to a first feed source of molten thermoplastic, an outlet which can be connected to the flat coextrusion die and at least one secondary channel possessing an inlet which can be connected to a second source of molten thermoplastic, a distribution torus surrounding the central channel and an outlet connected to the central channel upstream of the flat coextrusion die, in which the central channel, in the zone where it connects to at least one secondary channel, is equipped with a flat portion which alters its cross-section, characterized in that the flat portion is mounted in a removable piece coaxial with the central channel and arranged in a guide tube which intersects the central channel and runs from one side of the feed block to the other, the said feed block being moreover equipped with means which make it possible gradually to withdraw the removable piece via the guide tube and to replace it with another removable piece equipped with a flat portion, the said removable piece having been introduced beforehand into the guide tube.

According to a preferred embodiment, the means which allow the removable piece to be withdrawn consist of an extracting device. Advantageously this extracting device can be equipped with movable jaws which cooperate with notches provided in the removable piece which is to be withdrawn.

Furthermore, the means which allow the removable piece to be replaced advantageously consist of a controllable pneumatic or hydraulic plunger which travels along the axis of the guide tube.

It is obvious that the removable pieces successively introduced into the guide tube so as to be successively substituted for the removable piece in service can be equipped with flat portions of identical or different geometrical configuration depending on the circumstances.

In the feed block according to the invention, it is also obvious that it is possible to provide for the possibility of replacing removable pieces equipped with flat portions at the zone where the central channel connects with one or more secondary channels.

With the feed block according to the invention, if it proves useful, for any reason, to change or modify a flat portion, it suffices to introduce, into the appropriate guide channel, a removable piece equipped with the desired flat portion and thereafter, by using the means of replacement, bring this piece into service, while the piece taken out of service can then be withdrawn from the guide tube.

It is obvious that the geometry of the guide tube, in particular its cross-section, must correspond to the geometry of the removable pieces in order to avoid any leakage of thermoplastic. In particular, the removable pieces can be equipped with some sort of sealing system to ensure perfect leaktightness in operation. In general, the cross-section of the guide tube and hence of the removable pieces is preferably rectangular. According to a preferred embodiment, the guide tube runs at right angles to the axis of the central channel of the feed block.

The removable pieces can be made in one or more parts, in particular in accordance with the machining requirements.

According to a preferred embodiment the guide tube is equipped, in its portion which allows the removable pieces to be introduced, with electrical or other means of heating, so as to allow the successive removable pieces to be brought to a suitable temperature before being put into service. It can also prove valuable to provide, in the guide tube, means which allow the removable pieces to be placed under vacuum before being brought into service, so as to minimize any entry of air into the thermoplastics feeds when changing a removable piece.

Furthermore, the guide tube can advantageously be equipped with means such as retractable stops which lock the removable piece into position when in service.

So as to restrict the interference with running when changing a removable piece, it is advisable to carry out this change rapidly. To this effect, it is generally preferred that the plunger which effects this exchange should travel at a linear speed of at least 5 cm/sec.

To this effect, it has also proved useful to design the removable pieces so that the interference with flow is minimized when changing a removable piece and so that in particular the dimension of these pieces, in their direction of travel, is reduced to the minimum.

It is however possible to effect a replacement of a removable piece at a very low speed if the molten thermoplastic feeds are interrupted during this change.

Furthermore, in order to avoid any problem in the event of a removable piece accidentally becoming blocked in the guide tube, it can prove useful to provide a means of alarm which detects this type of operational fault. This alarm device can furthermore be so designed as optionally to interrupt, immediately or after a given time, the molten thermoplastic feeds in the feed block.

With the feed block according to the invention it is possible to feed a flat coextrusion die with a composite stream of molten thermoplastics of all types and with any geometrical configuration without interrupting a manufacturing cycle.

The feed block according to the invention is moreover explained in more detail in the description, which now follows, of a possible practical embodiment. In this description reference will be made to the figures of the attached drawings, in which:

FIGS. 4 and 5 are, respectively, upstream and downstream perspective views of a removable piece used in the feed block of FIG. 1.

Figure 3:
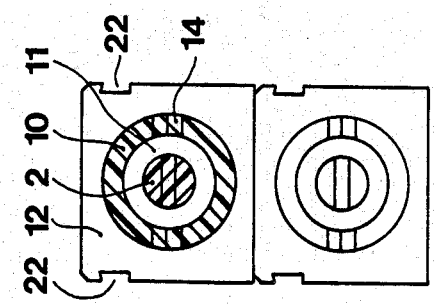
FIG. 3 is a left-hand profile view of the removable pieces of FIG. 1 along axis BB'.

As will be seen in the Figures, the feed block 1 according to the invention, of which only the essential components required for an understanding of the invention have been shown, comprises a central channel 2 of which the inlet 3 is connected to a source of molten thermoplastic which is not shown and of which the outlet 4 is connected to a flat coextrusion die which is also not shown and a secondary channel 5 of which the inlet 6 is connected to a second molten thermoplastic source, which is not shown.

The secondary channel 5 first opens into a distribution torus 7 equipped with a conventional adjustment ring 8 of which the position can be controlled by means of adjustment bolts 9. As is normal practice, the distribution torus 7 is inclined relative to the axis of the central channel 2 and has a cross-section which progressively decreases, the maximum cross-section being located opposite its feed point with molten thermoplastic and the minimum cross-section being located at 180° to the maximum cross-section.

The molten thermoplastic fed into the feed torus 7 flows via the secondary channel into its portion 10 which surrounds the central channel 2 and is then applied onto the stream of molten thermoplastic fed through the central channel 2. As is usual practice, the stream of molten thermoplastic, of circular cross-section, fed through the central channel 2 is spread by means of a flat portion 11 of appropriate profile, upstream of the point at which it encounters the stream of molten thermoplastic fed through the secondary channel 10.

According to the invention, the flat portion 11 is mounted in a removable piece 12 coaxial with the central channel 2 and arranged in a guide tube 13 which intersects the central channel 2 and runs from one side of the feed block 1 to the other, in the zone where the central channel 2 connects with the secondary channel 10.

As emerges more clearly from FIGS. 3 and 5, the flat portion 11 is fixed in the removable piece 12 by means of support fins 14.

For reasons of ease of machining the flat portion 11, the removable piece 12 is made in two parts, 15, 16, which are assembled together by means of fixing devices 17.

Figure 1:
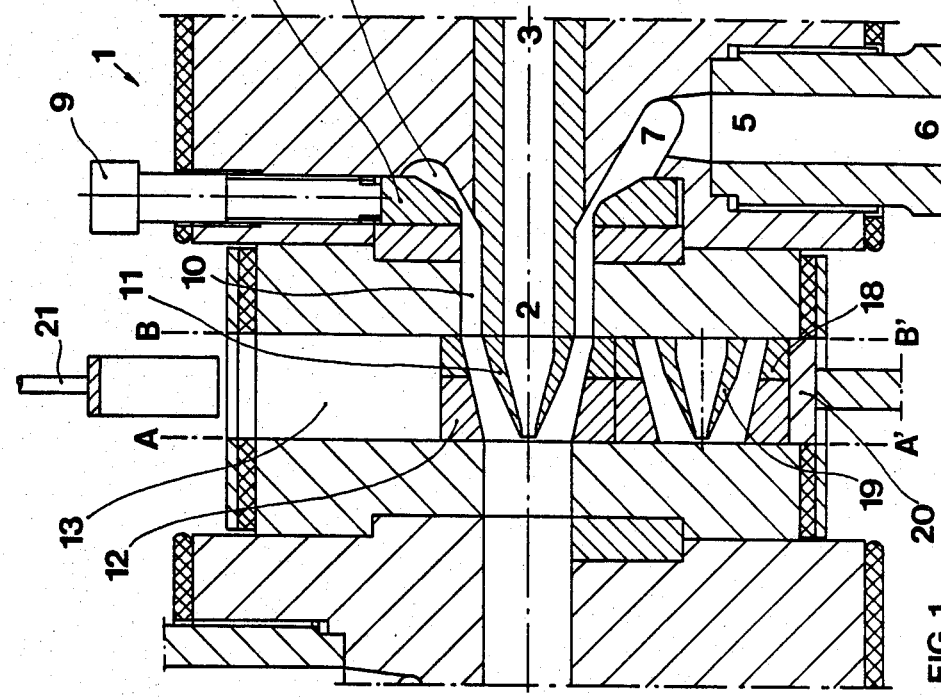
FIG. 1 is an elevation view and cross-section view of a feed block according to the invention.
Figure 2:
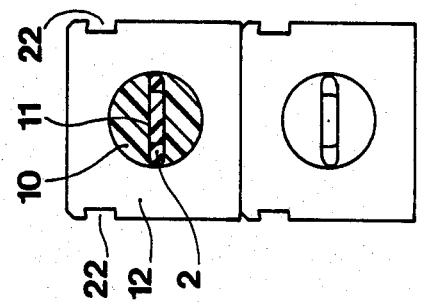
FIG. 2 is a right-hand profile view of the removable pieces of FIG. 1 along axis AA'.

As will be seen in FIG. 1, a second removable piece 18 also possessing a flat portion 19 is arranged in the guide tube 13 against the removable piece 12 and is held in place by a pneumatic plunger 20.

In order to bring this second removable piece 18 into service instead of, and in place of, the removable piece 12, it suffices to bring about a controlled movement of the pneumatic plunger 20 so that this piece is brought into the position occupied by the removable piece 12, that is to say into the position coaxial with the central channel 2. This movement must be performed at a relatively high speed to minimize any disturbance in the flow of the streams of molten thermoplastics.

During this movement the removable piece 12 is gradually taken out of service under the pushing action of the removable piece 18 and when the latter is in position, the removable piece 12 can be withdrawn from the guide tube 13 by means of an extracting device 21 equipped with movable jaws which can cooperate with extraction notches 22 provided in the removable piece 12. This removable piece 12 can then be cleaned so that it can be subsequently put back into service.

It is thus clear that the feed block described permits easy replacement of the flat portion which provides the geometrical modification of a stream of molten thermoplastic flowing in the central channel.

The feed block which has just been described can give rise to numerous different embodiments.

Thus, the central channel 2 can be of rectangular or other cross-section.

The guide tube 13 can be designed to contain a plurality of removable pieces which are identical or different in respect of the flat portion, and these pieces can be successively put into service.

The removable pieces can be equipped with centering means which ensure that they are correctly brought into service and/or means which ensure perfect leaktightness in respect of the streams of molten thermoplastic which are being fed.

The guide tube 13 can be equipped with heating means which ensure that successive removable pieces are brought to a suitable temperature before being put into service and/or with means which ensure that the removable pieces are subjected to vacuum before being brought into service.

Finally, the feed block can be equipped with a plurality of devices which allow the replacement of flat portions at several levels and can be provided with an alarm device which signals any incorrect positioning of a removable piece equipped with a flat portion.

We claim:

1. Feed block for a flat coextrusion die, comprising a central channel possessing an inlet which can be connected to a first feed source of molten thermoplastic, an outlet which can be connected to the flat coextrusion die and at least one secondary channel possessing an inlet which can be connected to a second source of molten thermoplastic, a distribution torus surrounding the central channel and an outlet connected to the central channel upstream of the flat coextrusion die, in which the central channel, in the zone where it connects to at least one secondary channel, is equipped with a flat portion which alters its cross-section, characterized in that the flat portion (11) is mounted in a removable piece (12) coaxial with the central channel (2) and arranged in a guide tube (13) which intersects the central channel (2) and runs from one side of the feed block to the other, the said feed block (1) being moreover equipped with means (20)(21) which make it possible gradually to withdraw the removable piece (12) via the guide tube (13) and replacing it by another removable piece (18) equipped with a flat portion (19), the said removable piece (18) having been introduced beforehand into the guide tube (13).

2. Feed block according to claim 1, characterized in that the means which allow the removable piece (12) to be withdrawn consists of an extracting device (21).

3. Feed block according to claim 2, characterized in that the extracting device (21) is equipped with movable jaws which cooperate with notches (22) provided in the removable piece (12).

4. Feed block according to claim 1, characterized in that the means which allow the removable piece (12) to be replaced consist of a plunger (20) which travels along the axis of the guide tube (13).

5. Feed block according to claim 4, characterized in that the plunger (20) travels at a speed of at least 5 cm/sec.

6. Feed block according to claim 1, characterized in that the guide tube (13) is equipped with means of heating the removable pieces.

7. Feed block according to claim 1, characterized in that it is equipped with a means of alarm in the event of a removable piece (12)(18) becoming blocked in the guide tube (13).

8. Feed block according to claim 1, characterized in that the guide tube (13) is equipped with means which ensure that the removable pieces (18) are placed under vacuum before being put into service.

9. Feed block according to claim 1, characterized in that the guide tube (13) is equipped with means which lock the removable piece (12) into position when in service.

* * * * *